(12) United States Patent
Kitazawa

(10) Patent No.: US 12,294,402 B2
(45) Date of Patent: May 6, 2025

(54) RADIO CONTROL TRANSMITTER

(71) Applicant: Futaba Corporation, Mobara (JP)

(72) Inventor: Hideo Kitazawa, Mobara (JP)

(73) Assignee: FUTABA CORPORATION, Mobara (JP)

( * ) Notice: Subject to any disclaimer, the term of this patent is extended or adjusted under 35 U.S.C. 154(b) by 627 days.

(21) Appl. No.: 17/729,486

(22) Filed: Apr. 26, 2022

(65) Prior Publication Data

US 2022/0352918 A1 Nov. 3, 2022

(30) Foreign Application Priority Data

Apr. 28, 2021 (JP) ................. 2021-075972

(51) Int. Cl.
 *H04B 1/3888* (2015.01)
 *G05G 1/10* (2006.01)
(52) U.S. Cl.
 CPC ............. *H04B 1/3888* (2013.01); *G05G 1/10* (2013.01)
(58) Field of Classification Search
 CPC ................................ H04B 1/3888; G05G 1/10
 See application file for complete search history.

(56) References Cited

U.S. PATENT DOCUMENTS

2022/0352917 A1* 11/2022 Kitazawa ............. H04B 1/3888

FOREIGN PATENT DOCUMENTS

| JP | 2001062160 A | * | 3/2001 | ........... H04B 1/3888 |
| JP | 2015213660 A | * | 12/2015 | ........... H04B 1/3888 |

* cited by examiner

*Primary Examiner* — David Bilodeau
(74) *Attorney, Agent, or Firm* — BACON & THOMAS, PLLC

(57) ABSTRACT

A radio control transmitter comprising a grip portion gripped by an operator at the time of performing remote control of a control target, a base portion disposed at one end of the grip portion, and a head portion disposed at the other end of the grip portion and having an operating unit configured to control the control target, and configured to transmit a control signal to the control target in response to an operation of the operating unit is described herein. The head portion includes a fitting hole in which a plurality of round holes are continuously arranged in a width direction of the head portion is formed at a bottom portion of a housing of the head portion, and a horizontal angle of the trigger centered on a holding position of the base end is changed in a stepwise manner.

4 Claims, 11 Drawing Sheets

RADIO CONTROL TRANSMITTER

TECHNICAL FIELD

The present disclosure relates to a radio control transmitter for performing remote control of a control target, e.g., various models (automobiles, motorcycles, aircraft, ships, and the like), a drone, an industrial machine such as a crane or the like, via wireless communication.

BACKGROUND

Conventionally, a radio control transmitter including a trigger for operating a throttle of an engine or a motor and a wheel for controlling steering of a control target is known as a radio control transmitter used mainly for operating a model car.

Such a radio control transmitter is operated by people in a wide range of generations. Therefore, the hand size of an operator who operates a trigger or a wheel varies. Particularly, it is required to adjust a trigger position depending on the hand size of an operator such that the operator can comfortably move an index finger or a middle finger.

In order to meet the above demand, there is suggested a radio control transmitter disclosed in Japanese Patent Application Publication No. 2001-062160. This radio control transmitter includes a trigger unit having a trigger functioning as an operating unit. The trigger is rotatably attached to a shaft disposed at the trigger unit, and the trigger unit is configured to be slidable in a forward-backward direction with respect to the main body. Accordingly, the trigger unit can be adjusted steplessly to any position within the slidable range with respect to a main body, and an operator can adjust the trigger position to be suitable for a hand size.

SUMMARY

In the radio control transmitter, especially when an operator is an expert, the operator has a unique way of putting a finger on a trigger and controlling a control target in a state similar to an actual operation. Therefore, the operation may be easier when the trigger is horizontally inclined with respect to the main body.

In the radio control transmitter disclosed in Japanese Patent Application Publication No. 2001-062160, although it was possible to adjust the trigger unit in the front-backward direction with respect to the main body, it was not possible to adjust an angle of the trigger to be suitable for the way in which an operator puts a finger on the trigger.

The present disclosure has been made in view of the above drawbacks, and has a purpose of providing a radio control transmitter capable of adjusting an angle of a trigger depending on an operator's preference.

In accordance with an aspect of the present disclosure, there is provided a radio control transmitter comprising a grip portion gripped by an operator at the time of performing remote control of a control target, a base portion disposed at one end of the grip portion, and a head portion disposed at the other end of the grip portion and having an operating unit configured to control the control target, and configured to transmit a control signal to the control target in response to an operation of the operating unit. A fitting hole in which a plurality of round holes are continuously arranged in a width direction of the head portion is formed at a bottom portion of a housing of the head portion. A base end of the operating unit near the grip portion is supported to be rotatable with respect to an inner wall surface of the housing of the head portion, and a tip end of the operating unit is aligned with and screw-fixed to the fitting hole so that a horizontal angle of the trigger centered on a holding position of the base end is changed in a stepwise manner.

In accordance with another aspect of the present disclosure, there is provided a radio control transmitter comprising a grip portion gripped by an operator at the time of performing remote control of a control target, a base portion disposed at one end of the grip portion, and a head portion disposed at the other end of the grip portion and having an operating unit configured to control the control target, and configured to transmit a control signal to the control target in response to an operation of the operating unit. A fitting hole in which a round hole by is elongated by a predetermined length in a width direction of the head portion is formed at a bottom portion of a housing of the head portion. A base end of the operating unit near the grip portion is supported to be rotatable with respect to an inner wall surface of the housing of the head portion, and a tip end of the operating unit is aligned with and screw-fixed to the fitting hole so that a horizontal angle of the trigger centered on a holding position of the base end is changed continuously.

In accordance with the radio control transmitter of the present disclosure, an elongated hole formed by elongating a round hole by a predetermined length in a direction perpendicular to a rotation axis of the trigger is formed at the tip end of the operating unit, and the operating unit is movable in a forward-backward direction of the head portion along an inner wall surface of the housing of the head portion, and the elongated hole is aligned with and screw-fixed to the fitting hole.

BRIEF DESCRIPTION OF THE DRAWINGS

The objects and features of the present disclosure will become apparent from the following description of embodiments, given in conjunction with the accompanying drawings, in which.

DETAILED DESCRIPTION

Hereinafter, embodiments of the present disclosure will be described in detail with reference to the accompanying drawings.

A radio control transmitter (hereinafter, simply referred to as "transmitter") according to the present disclosure performs remote control of a control target, e.g., various models (automobiles, motorcycles, aircraft, ships, and the like), a drone, an industrial machine such as a crane or the like, by using a predetermined frequency band (e.g., 2.4 GHz band), determining a transmission frequency using a frequency hopping method that automatically selects an empty band of the frequency band, and transmitting to the control target a control signal (radio wave) corresponding to an operation of operating members (wheel and trigger) disposed at a housing.

In this example, a case where a transmitter performs remote control of a model car as a control target will be described as an example. Although it is assumed that an engine is used as a power source of the control target, a motor may be used as the power source.

<1. Configuration of Transmitter>

Figure 1:
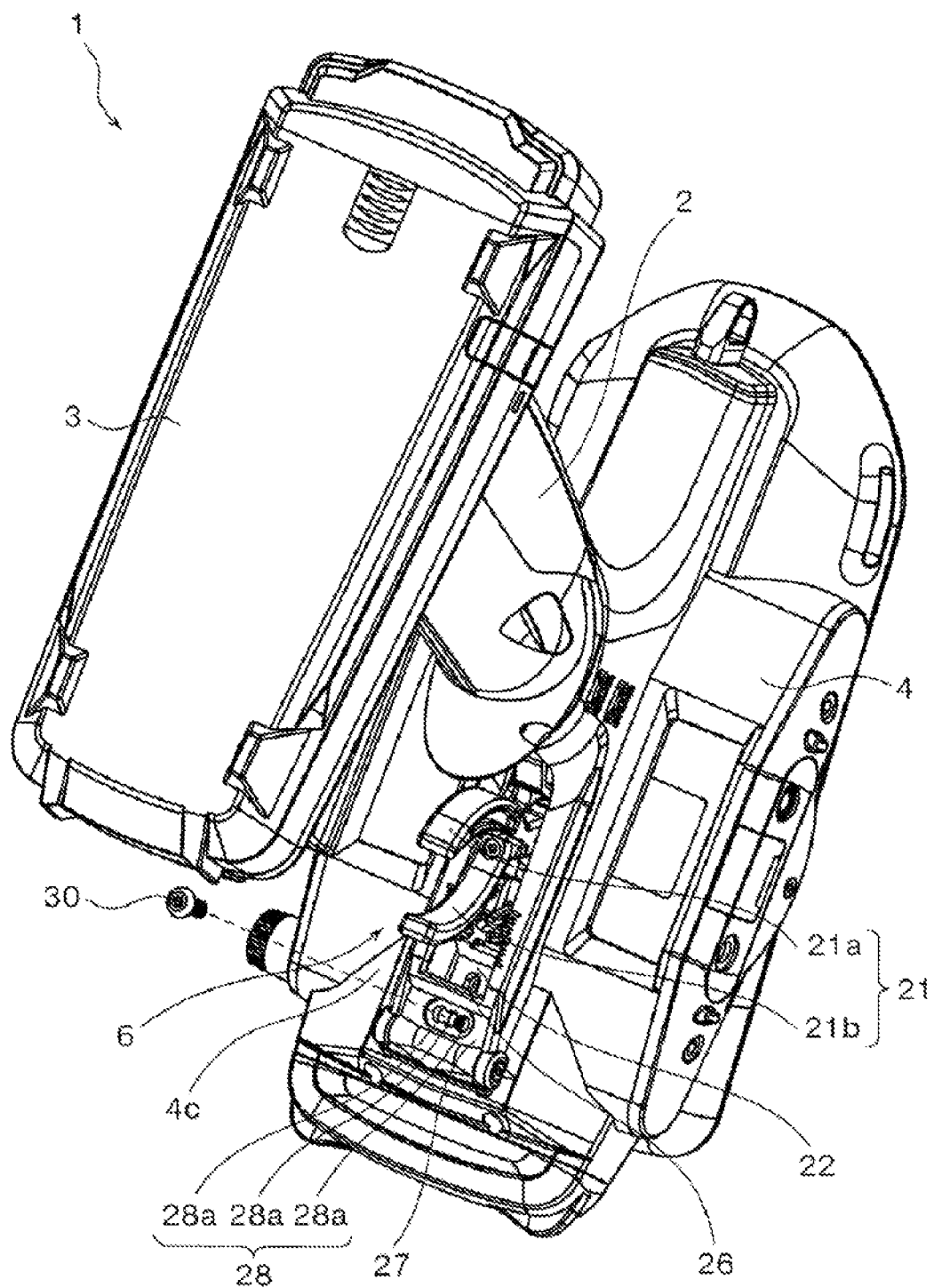
FIG. 1 is a perspective view showing an overall configuration of a radio control transmitter according to the present disclosure when viewed from a bottom surface side.
Figure 2:
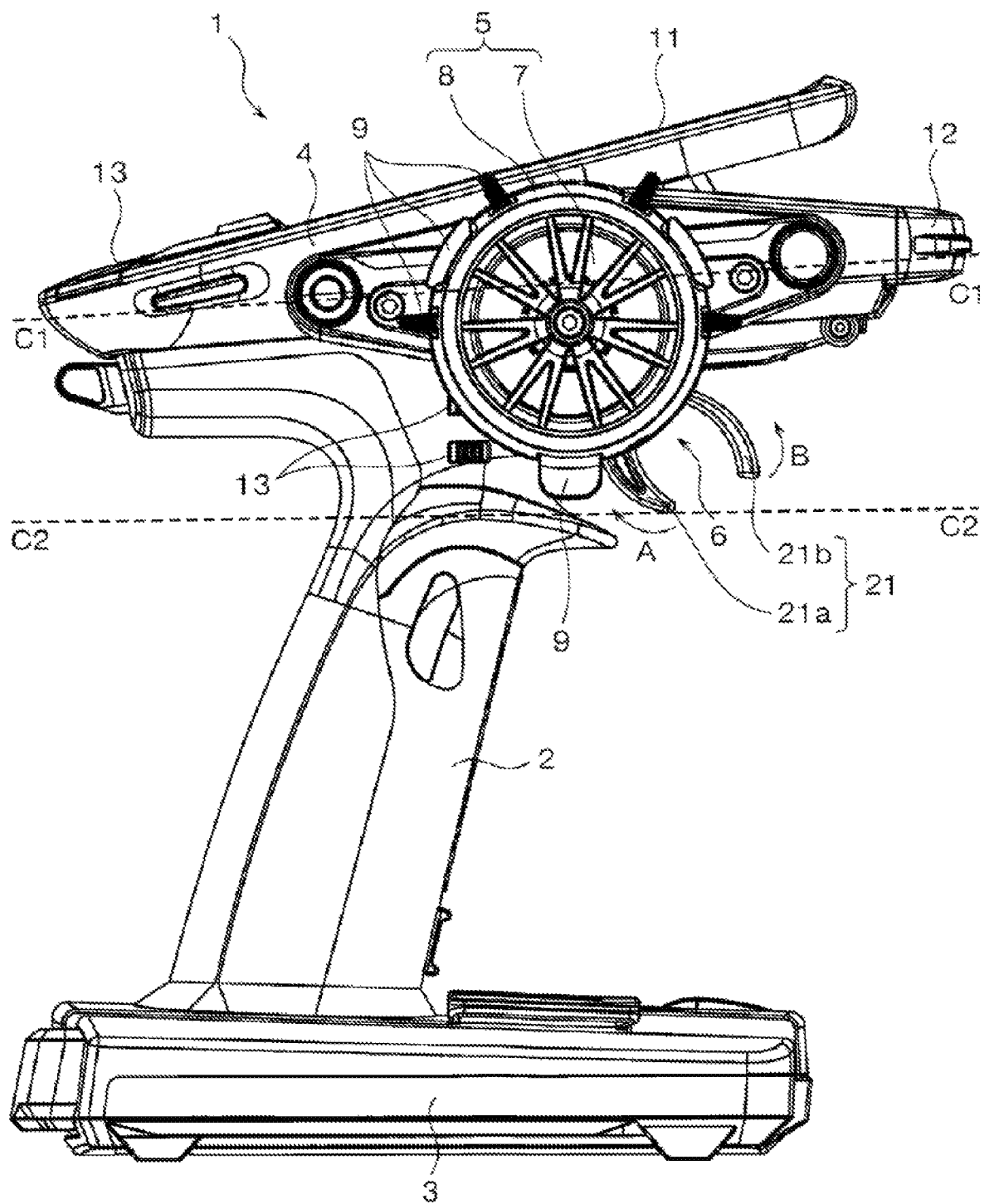
FIG. 2 is a side view showing the overall configuration of the radio control transmitter according to the present disclosure.

As shown in FIGS. 1 and 2, the transmitter 1 comprises a grip portion 2, a base portion 3, and a head portion 4. A housing of each portion is made of a flexible thermoplastic resin (e.g., general-purpose plastic). As shown in FIG. 2, in the transmitter 1, the head portion 4, the grip portion 2, and the base portion 3 are arranged in that order from the top in a substantially Z shape.

<1-1. Grip Portion>

The grip portion 2 has one end (lower end of FIGS. 1 and 2) integrated with the base portion 3 and the other end (upper end of FIGS. 1 and 2) integrated with the head portion 4. The grip portion 2 has a thin elliptical columnar outer shape elongated from the base portion 3 toward the head portion 4. The grip portion 2 is gripped by an operator who performs remote control of the control target.

<1-2. Base Portion>

The base portion 3 is disposed at one end (lower end of FIGS. 1 and 2) of the grip portion 2, and has a rectangular shape. The base portion 3 prevents a hand gripping the grip portion 2 from slipping out of the grip portion 2 by restricting a lower limit position of the hand, and also functions as a leg having a bottom surface of a predetermined installation area when the transmitter 1 is not used and placed upright on the ground, for example.

<1-3. Head Portion>

The head portion 4 is disposed at the other end (upper end of FIGS. 1 and 2) of the grip portion 2, and includes, as operating units for controlling the control target, a wheel unit 5 and a trigger unit 6 whose angle and length can be adjusted, which is a main part of the present disclosure.

In the wheel unit 5, a wheel (rotatable member) 7 is detachably attached to a main body fitting portion 4a of the head portion 4 via a cylindrical switch operating member 8 on one side surface (right surface or left surface) of the head portion 4 depending on a dominant hand of an operator. FIG. 1 or 2 show a case where the operator is right-handed.

The wheel 7 is an operating member as a steering for controlling a traveling direction of the control target. As shown in FIG. 2, the wheel 7 is supported at the main body fitting portion 4a attached to one side surface (right surface or left surface) of the head portion 4 via the switch operating member 8 by a rotation shaft whose center coincides with a center of a substantially disc-shaped surface and extending along the head portion 4 of the transmitter 1 in a direction perpendicular to the substantially disc-shaped surface. The wheel 7 is operated as a steering for controlling the traveling direction of the control target while rotating in a clockwise direction and a counterclockwise direction from a predetermined reference position.

Multiple types of switches 9, such as a trim switch, a function switch, and the like, are disposed at a cylindrical outer peripheral portion of the switch operating member 8. An arbitrary function is assigned to each of the switches 9 by predetermined setting.

Further, the head portion 4 is provided with a display portion 11 and an antenna 12. The display portion 11 is inclined at a predetermined angle with respect to the main body of the head portion 4 connected to the grip portion 2 so that an operator can easily see a display screen when the operator grips the grip portion 2. The display portion 11 is a display for displaying settings of the transmitter 1, and it is possible to switch display contents or change the settings of the transmitter 1 by operating a setting operating member 12, such as an operation button, a slide switch, or the like, disposed around the display portion 11.

The antenna 12 of the transmitter 1 in the present embodiment is rotatably supported at one end (i.e., an end of the head portion 4 which is opposite to an end facing an operator in a state where the corresponding operator grips the grip portion 2) of the head portion 4 which is opposite to a display surface of the display portion 11 in a state where an operator grips the grip portion 2. In the case of performing remote control of the control target, the antenna 12 is rotated by 90° from a horizontal state (state of FIG. 2) in which it integrally forms an outer shape with the head portion 4, and is used in an upright state in a vertical direction. The directivity at the time of performing remote control of the control target can be improved by using the antenna 12 in an upright state.

The transmitter 1 is provided with a plurality of operating members, such as buttons and the like, in addition to the wheel 7 and the trigger 21. Special operations related to the operation of the control target can be assigned to these operating members.

<1-4. Electrical Configuration>

Figure 3:
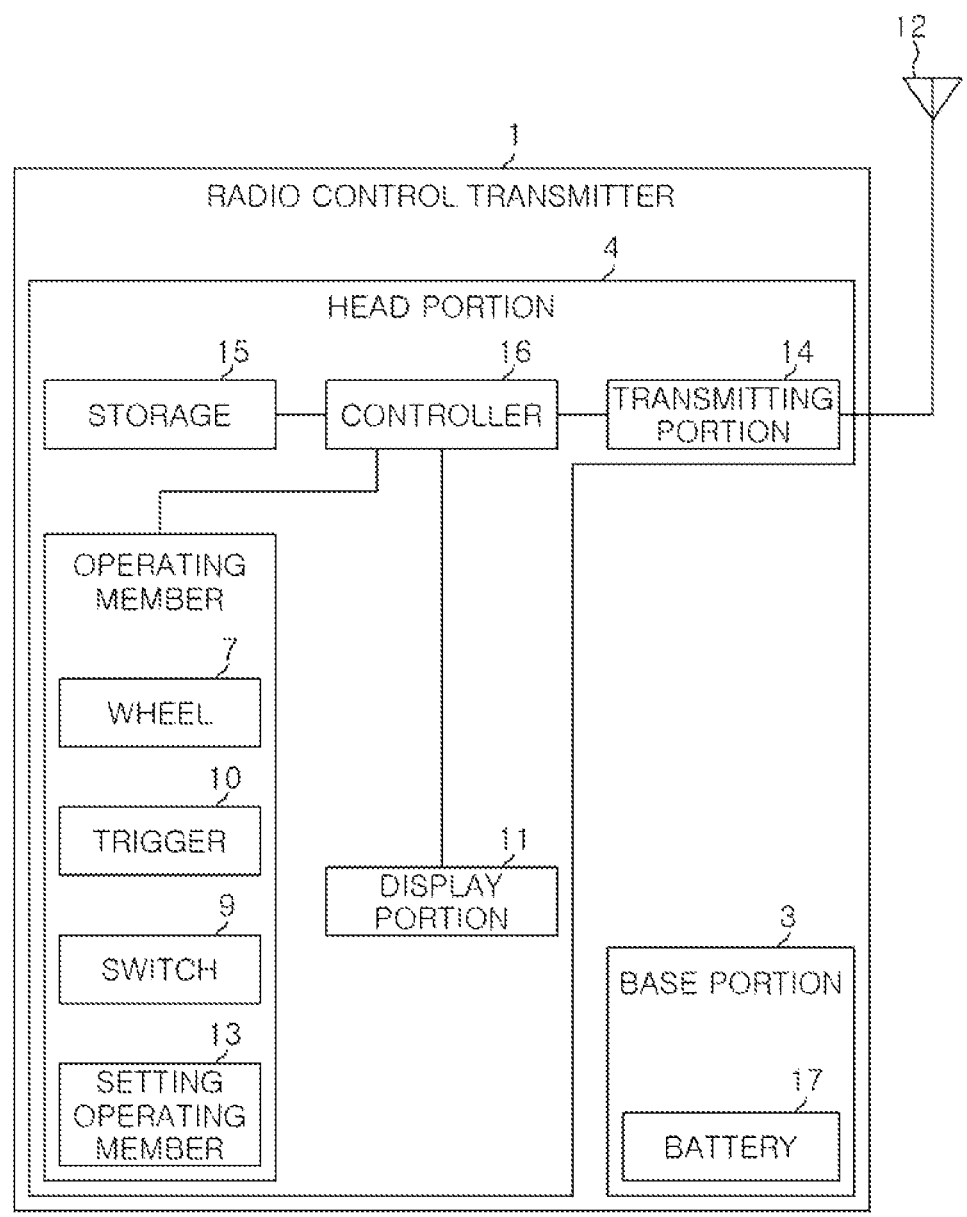
FIG. 3 is a block diagram showing an electrical configuration of the radio control transmitter according to the present disclosure.

As shown in FIG. 3, the head portion 4 has therein an electrical circuit including a transmitting portion 14, a storage 15, and a controller 16, in addition to the above-described display portion 11.

The base portion 3 is provided with a replaceable battery 17 for supplying a driving power required for individual components (the display portion 11, the transmitting portion 14, the storage 15, and the controller 16) of the electrical circuit.

The transmitting portion 14 modulates/amplifies transmission data generated by operating or setting the wheel 7 or the trigger 21, and transmits the modulated/amplified control signal to the control target via the antenna 12 under the control of the controller 16.

The storage 15 stores various setting information based on the operation of the setting operating member 13 under the control of the controller 18. Further, the storage 15 stores the functions assigned to various switches including the switches 9 in association with the switches by the setting operation of the setting operating member 13. Further, the storage 15 stores a control program for performing driving control of individual components of the transmitter 1.

The controller 16 performs overall control of the display portion 11, the transmitting portion 14, and the storage 15, such as the generation of the transmission data in response to the operation and setting of the wheel 7 or the trigger 21 to be described later, the display control of the display portion 11, the output control of the control signal from the transmitting portion 14 via the antenna 12, the storage of the setting information in the storage 15, the control of reading out and executing a function corresponding a switch that outputs a contact signal inputted from various switches including the switches 9, the driving control of the individual components of the transmitter 1 based on the control program stored in the storage 15, or the like.

In the transmitter 1 configured as described above, an operator operates the trigger 21 while gripping the grip portion 2 with one hand and putting an index finger or a middle finger of the hand holding the grip portion 2 on the trigger 21, and operates the wheel 7 while holding the wheel 7 with the other hand. Then, the control signal corresponding to the operation of the trigger 21 and the wheel 7 is transmitted to the control target to perform the remote control the control target.

<2. Configuration of Trigger Unit>

Next, a configuration of the trigger unit 6 whose angle and length can be adjusted, which is the main part of the present disclosure, will be described with reference to the accompanying drawings.

Figure 4:
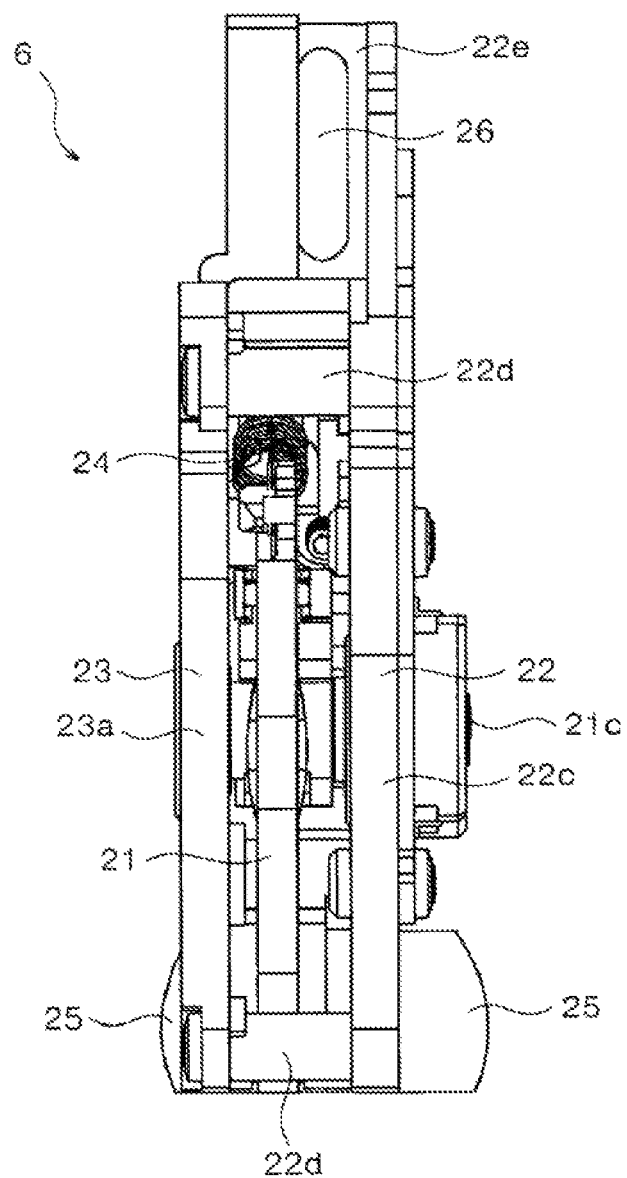
FIG. 4 is a plan view of a trigger unit of the radio control transmitter according to the present disclosure.

As shown in FIG. 4, the trigger unit 6 is rotatably supported in a state where the trigger 21 is interposed between a pair of support members 22 and 23.

Figure 5:
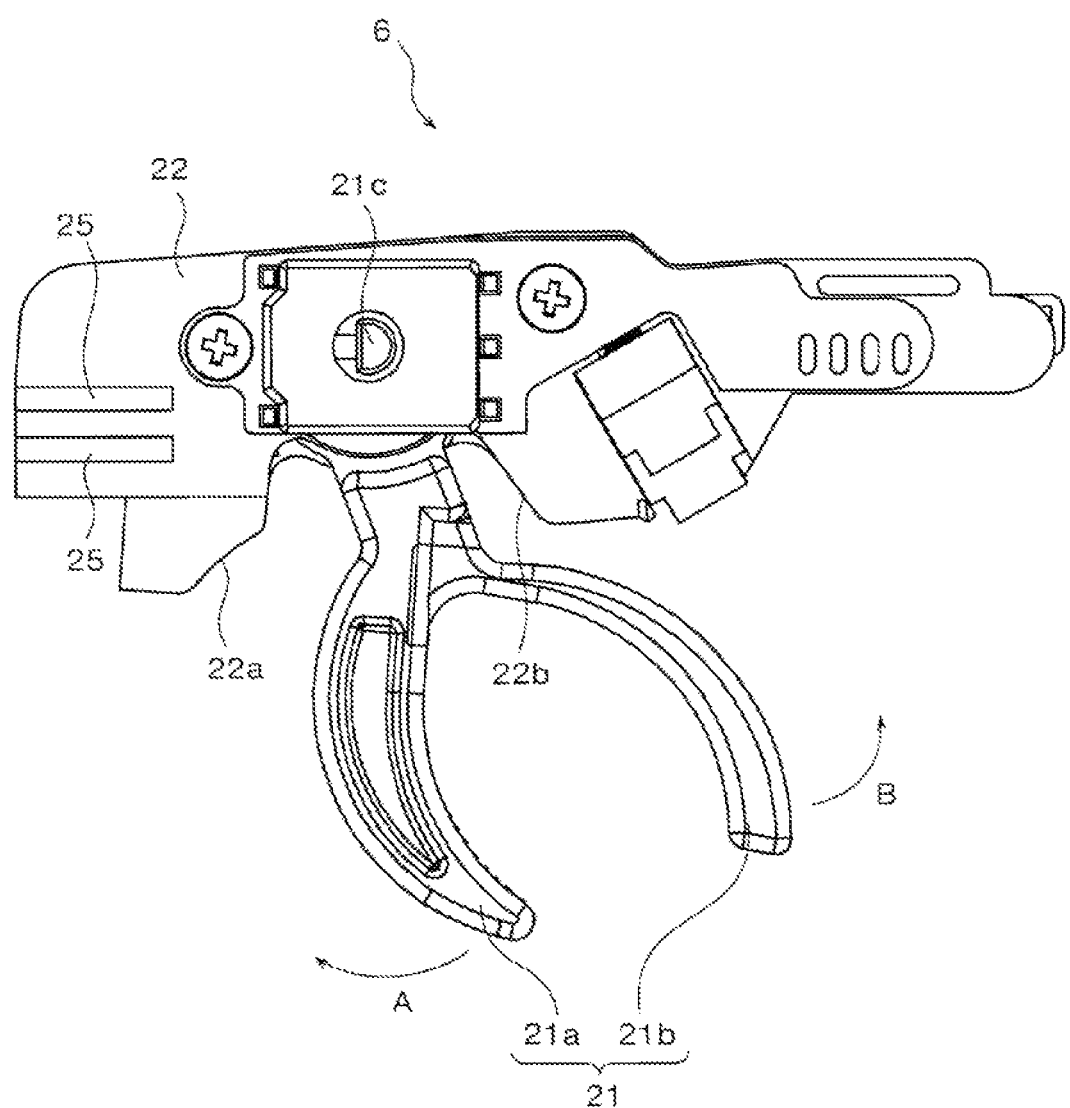
FIG. 5 is a side view of the trigger unit of the radio control transmitter according to the present disclosure.

The trigger 21 is an operating member for controlling a moving speed of the control target by controlling a power source of the control target. As shown in FIG. 2 or 5, the trigger 12 has a trigger shape and is divided into a throttle lever 21a as a first lever and a brake lever 21b as a second lever. The trigger 21 is supported by the pair of support members 22 and 23 to be rotatable in the directions of arrows A and B of FIG. 2 or 5.

The trigger 21 is pressed to an initial position shown in FIG. 2 or 5 by a pressing device 24 such as a coil spring, or the like. The trigger 21 is rotatable by an operator's operation about a rotation shaft 21c in the direction of the arrow A in FIG. 2 or 5 to a position where the throttle lever 21a is brought into contact with a contact surface 22a on the tip end side of the support member 22, and is rotatable in the direction of the arrow B of FIG. 2 or 5 to a position where the brake lever 21b is brought into contact with a contact surface 22b on the rear end side of the support member 22.

A base end of the brake lever 21b may be screw-fixed to the throttle lever 21a to be detachable and replaceable. In this case, multiple types of brake levers 21b, e.g., one having a length or shape corresponding to a thickness of an operator's finger, one having a buffer such as sponge or foam on a surface to be in contact with a finger to protect the finger, and the like, may be prepared in advance and replaced depending on circumstances.

In general, the trigger 21 is operated by putting an index finger or a middle finger of a hand holding the grip portion 2 on the throttle lever 21a and pulling the throttle lever 21a in the direction of the arrow A, and is operated by pushing the brake lever 21b in the direction of the arrow B with the back of the finger put on the throttle lever 21a.

The trigger 21 automatically returns to the initial position (state shown in FIG. 2 or 5) by the pressing force of the pressing device 24 when the finger on the throttle lever 21a is released. The initial position is referred to as "neutral position." At the neutral position, the engine of a control target is rotating, whereas the clutch thereof is disengaged, so that the control target is not traveling.

If the power source of the control target is a motor, the motor is not rotating at the neutral position.

The throttle of the engine of the control target is controlled by pulling the throttle lever 21a of the trigger 21 in the direction of the arrow A of FIG. 2 or 5, thereby controlling the moving speed of the control target. The control target is accelerated as the throttle lever 21a of the trigger 21 is operated in the direction of the arrow A of FIG. 2 or 5.

The brake can be controlled by operating the brake lever 21b of the trigger 21 in the direction of the arrow B of FIG. 2 or 5. The brake lever 21b of the trigger 21 has a stronger force as it is operated in the direction of the arrow B of FIG. 2 or 5.

Depending on the settings of the transmitter 1, the control target may be moved backward by operating the brake lever 21b of the trigger 21 in the direction of the arrow B of FIG. 2 or 5. Further, even when a motor is used as the power source of the control target, the control target can be accelerated by operating the throttle lever 21a of the trigger 21 in the direction of the arrow A of FIG. 2 or 5.

The support member 22 includes a plate-shaped support piece 22c that rotatably supports the trigger 21, a plurality of columns (spacers) 22d integrally formed at right angles to the inner surface facing the trigger 21, and a fitting piece 22e integrally formed at the tip end of the support piece 22c while being in parallel with the columns 22d. The support member 23 is screw-fixed to the plurality of columns 22d of the support member 22 in a state where the trigger 21 is interposed between the plate-shaped support piece 23a and the support piece 22c of the support member 22.

As shown in FIG. 4, arc-shaped protrusions 25 are integrally formed on the outer surfaces of the rear ends (lower end in FIG. 4) of the support members 22 and 23. As shown in FIG. 5, two arc-shaped protrusions 25 are formed side by side in a height direction.

Figure 7:
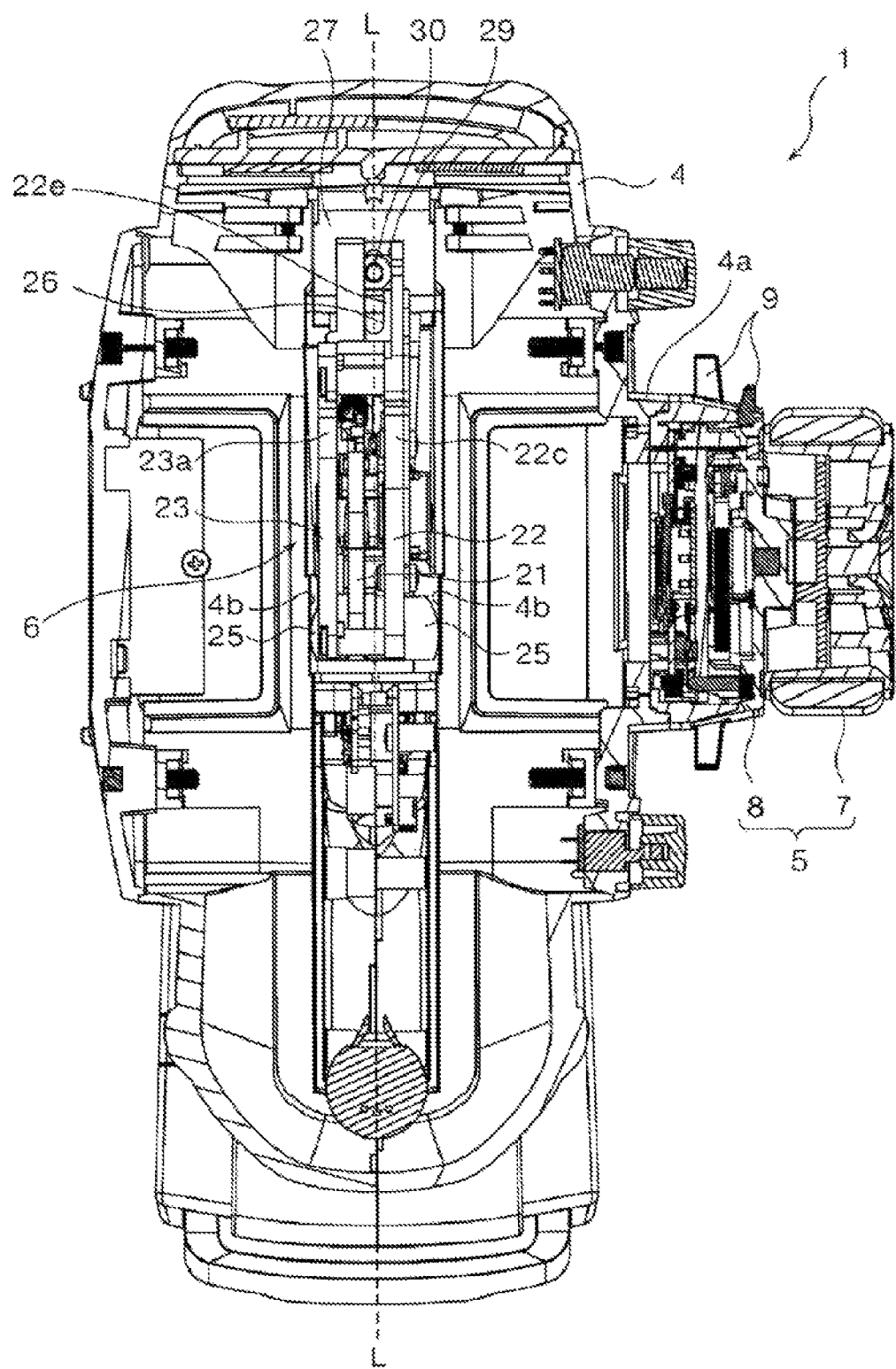
FIG. 7 is a cross-section view of the radio control transmitter taken along a line C1-C1 of FIG. 2 viewed from the upper surface side before angle adjustment of the trigger unit.

As shown in FIG. 7, the support members 22 and 23 are supported to be rotatable with respect to guide surfaces 4b and 4b formed on both inner wall surfaces of the housing of the head portion 4 with the arc-shaped protrusions 25 interposed therebetween and movable in the forward-backward direction (vertical direction in FIG. 7) of the head portion 4 along a central axis L.

As shown in FIG. 4, an elongated hole 26 for changing the position of the trigger unit 6 in the forward-backward direction (vertical direction in FIG. 4 or 7) with respect to the head portion 4 is formed at the fitting piece 22e of the support member 22. The elongated hole 26 is formed by elongating a round hole by a predetermined length in a direction perpendicular to the rotation shaft 21c of the trigger 21. By moving the pair of support members 22 and 23 of the trigger unit 6 in the forward-backward direction of the head portion 4 along the guide surfaces 4b and 4b of the head portion 4 and aligning and screw-fixing the elongated hole 26 to a fitting hole 28 of a fitting member 27 to be described later, the position of the trigger unit 6 in the forward-backward direction with respect to the head portion 4 can be changed, thereby adjusting the length of the trigger 21.

The length adjustment of the trigger 21 indicates the adjustment of the length between the inner peripheral surface of the grip portion 2 facing the throttle lever 21a and the inner surface of the throttle lever 21a.

In the trigger unit 6 configured as described above, the base ends of the pair of support members 22 and 23 rotatably supporting the trigger 21 near the grip portion 2 are supported to be rotatable with respect to the guide surfaces 4b and 4b formed on both inner wall surfaces of the housing of the head portion 4 and movable in the forward-backward direction of the head portion 4 along the central axis L, and the tip ends thereof are fitted to the fitting member 27 fixed to a bottom portion 4c of the housing of the head portion 4.

Figure 6:
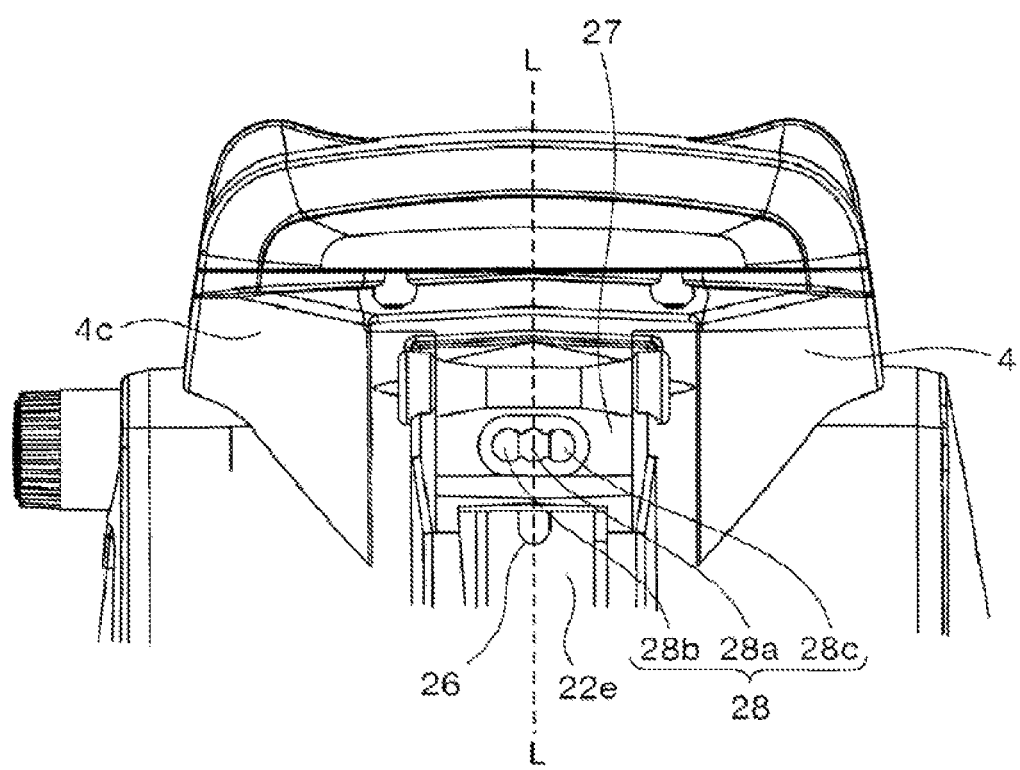
FIG. 6 is a partially enlarged view showing an example of a fitting hole through which the trigger unit of the radio control transmitter according to the present disclosure is fitted.
Figure 8:
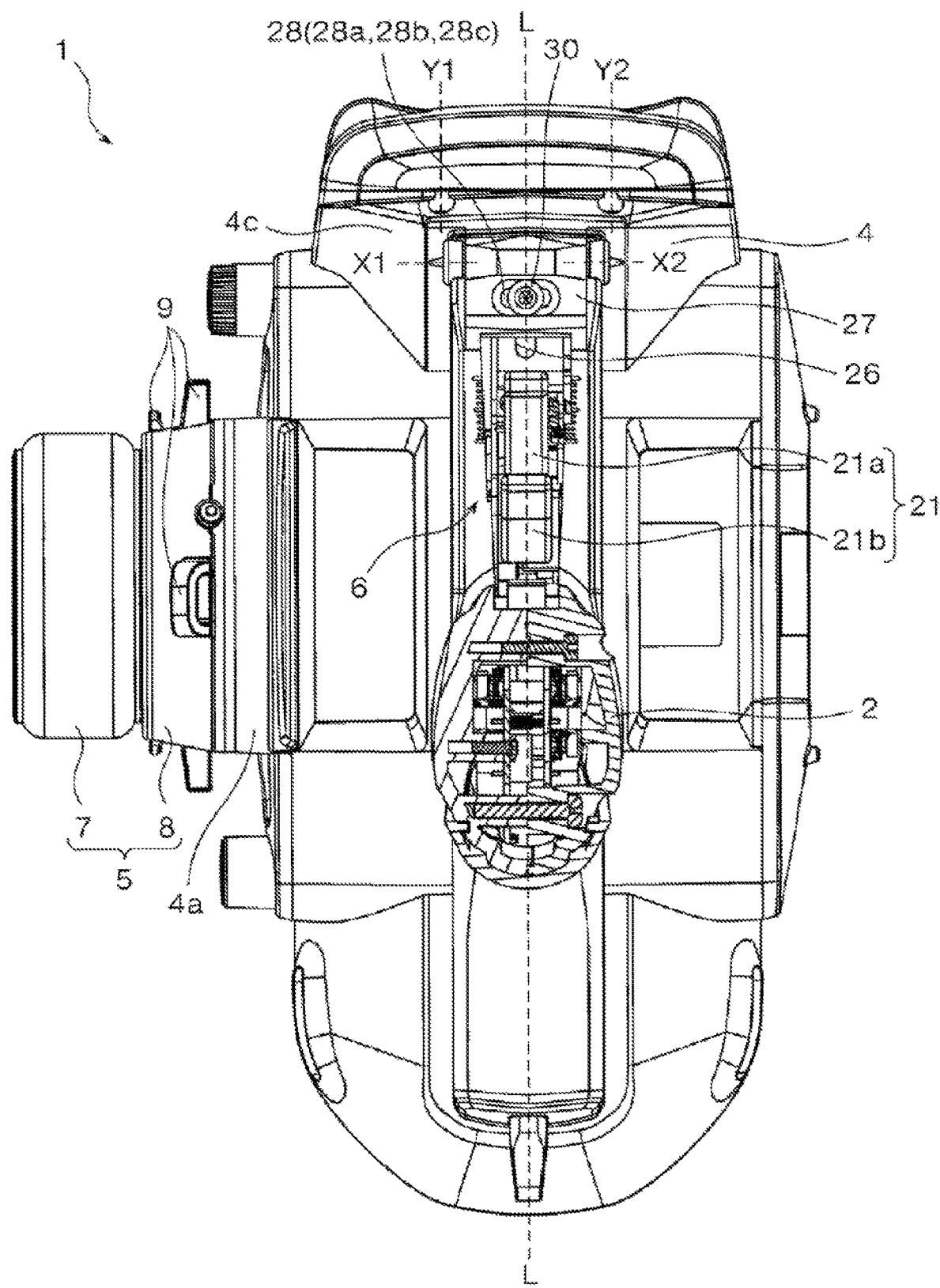
FIG. 8 is a cross-section view of the radio control transmitter taken along a line C2-C2 of FIG. 2 viewed from the bottom surface side before the angle adjustment of the trigger unit.

As shown in FIG. 8, the fitting member 27 is screw-fixed to the bottom portion 4c near the tip end of the head portion 4 at multiple locations perpendicular to each other (two locations in the width directions X1 and X2 and two locations in the length directions Y1 and Y2 of the head portion 4). The fitting member 27 has a fitting hole 28 to be aligned with the elongated hole 26 of the fitting piece 22e of the support member 22 to thereby fit the tip end of the trigger unit 6. As shown in FIG. 6, the fitting hole 28 has a gourd shape in which round holes 28b and 28c are continuously arranged on both sides of a round hole 28a on the central axis L in the width direction of the head portion 4.

A rectangular fixing block 29 having a screw hole is disposed on the elongated hole 26 of the support member 22 of the trigger unit 6 to fix the support member 22 to the fitting member 27. The trigger unit 6 is screw-fixed to the fixing block 29 by inserting the screw 30 into the fitting hole 28 and the elongated hole 26 from the outside of the bottom portion 4c of the head portion 4 and tightening the screw 30 into the screw hole of the fixing block 29. In the case of adjusting the angle or the length of the trigger unit 6, the screw 30 is loosened so that the fixing block 29 can move on the fitting piece 22e along the inner wall surface of the tip end of the support piece 22c of the support member 22 in a state where the tip end of the screw 30 is engaged. In that case, the screw 30 moves in the elongated hole 26 of the support member 22 together with the fixing block 29.

In a state where the screw 30 is loosened, the entire trigger unit 6 is rotated about the holding positions of the pair of support members 22 and 23 (the positions where the arc-shaped protrusions 25 are brought into contact with the guide surfaces 4b and 4b of the head portion 4) to align the elongated hole 26 of the support member 22 with any one of the round holes 28a, 28b, and 28c of the fitting hole 28 of the fitting member 27 and, then, the screw 30 is tightened again. By selectively changing the positions of the round holes 28a, 28b, and 28c of the fitting hole 28 to be aligned with the elongated hole 26, the horizontal angle θ of the trigger 21 centered on the holding positions of the pair of support members 22 and 23 of the trigger unit 6 can be changed in a stepwise manner.

Although the case in which the fitting holes 28 formed in the fitting member 27 has a structure in which the round holes 28b and 28c are continuously arranged on both sides of the round holes 28a on the central axis L in the width direction of the head portion 4 has been illustrated and described, the present disclosure is not limited thereto. For example, an arbitrary number of holes may be continuously arranged on both sides of the round holes 28a on the central axis L depending on the dimension of the width of the fitting member 27.

As described above, in the trigger unit 6 of the present embodiment, the base ends of the pair of support members 22 and 23 rotatably supporting the trigger 21 near the grip portion 2 are supported to be rotatable with respect to the guide surfaces 4b and 4b formed on both inner wall surfaces of the housing of the head portion 4, and the elongated hole 26 of the fitting piece 22e of the support member 22 is aligned and screw-fixed to any one of the round holes 28a, 28b, and 28c of the fitting hole 28 so that the horizontal angle θ of the trigger 21 centered on the holding positions of the pair of support members 22 and 23 can be changed in a stepwise manner.

Specifically, in a state where the horizontal angle θ of the trigger 21 centered on the holding positions of the pair of support members 22 and 23 coincides with the central axis L, the elongated hole 26 of the fitting piece 22e of the support member 22 is aligned and screw-fixed to the round hole 28b formed at the center of the fitting hole 28, as shown in FIG. 8.

Figure 9:
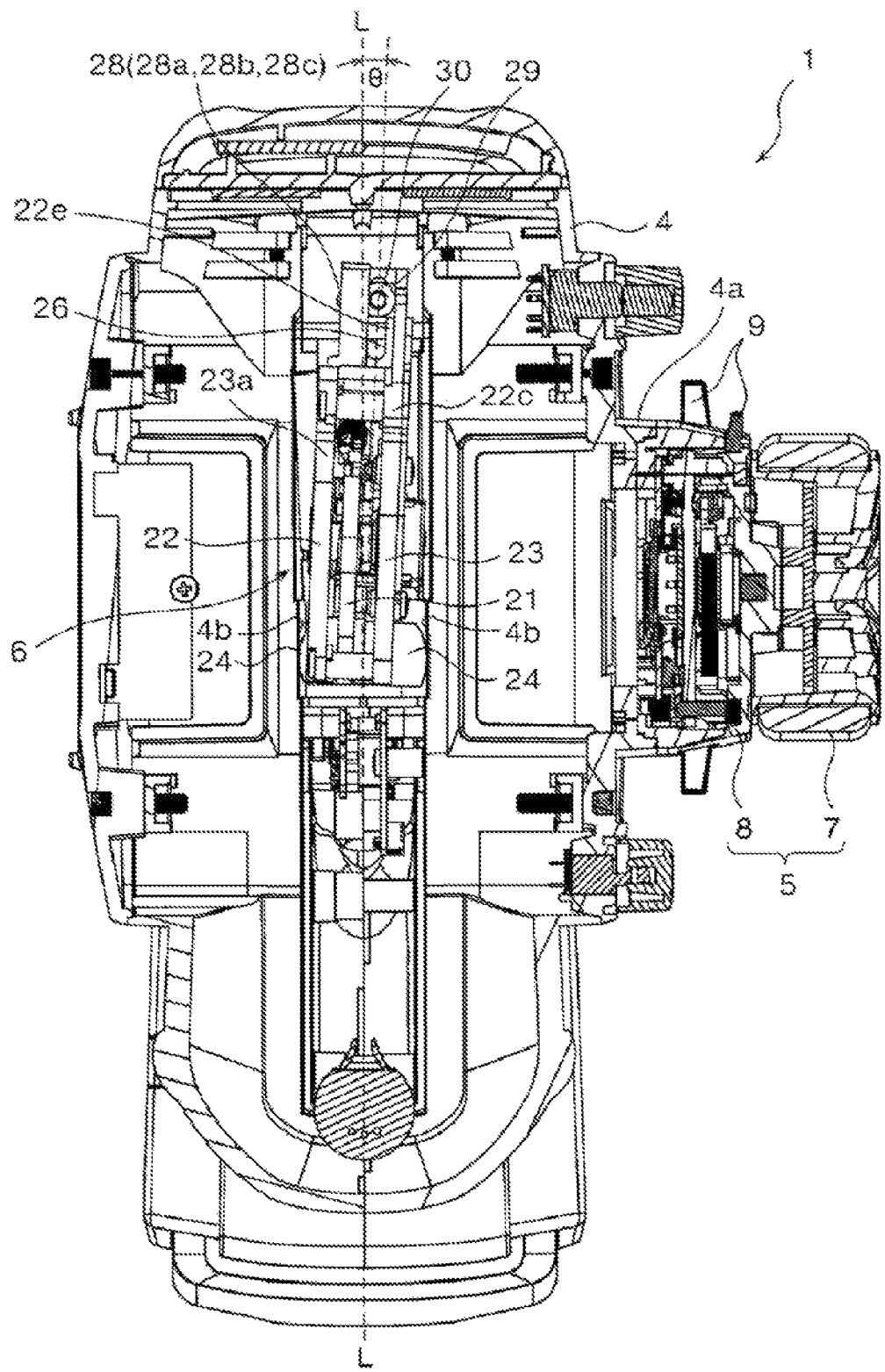
FIG. 9 is a cross-section view of the radio control transmitter taken along the line C1-C1 of FIG. 2 viewed from the upper surface side after the angle adjustment of the trigger unit.
Figure 10:
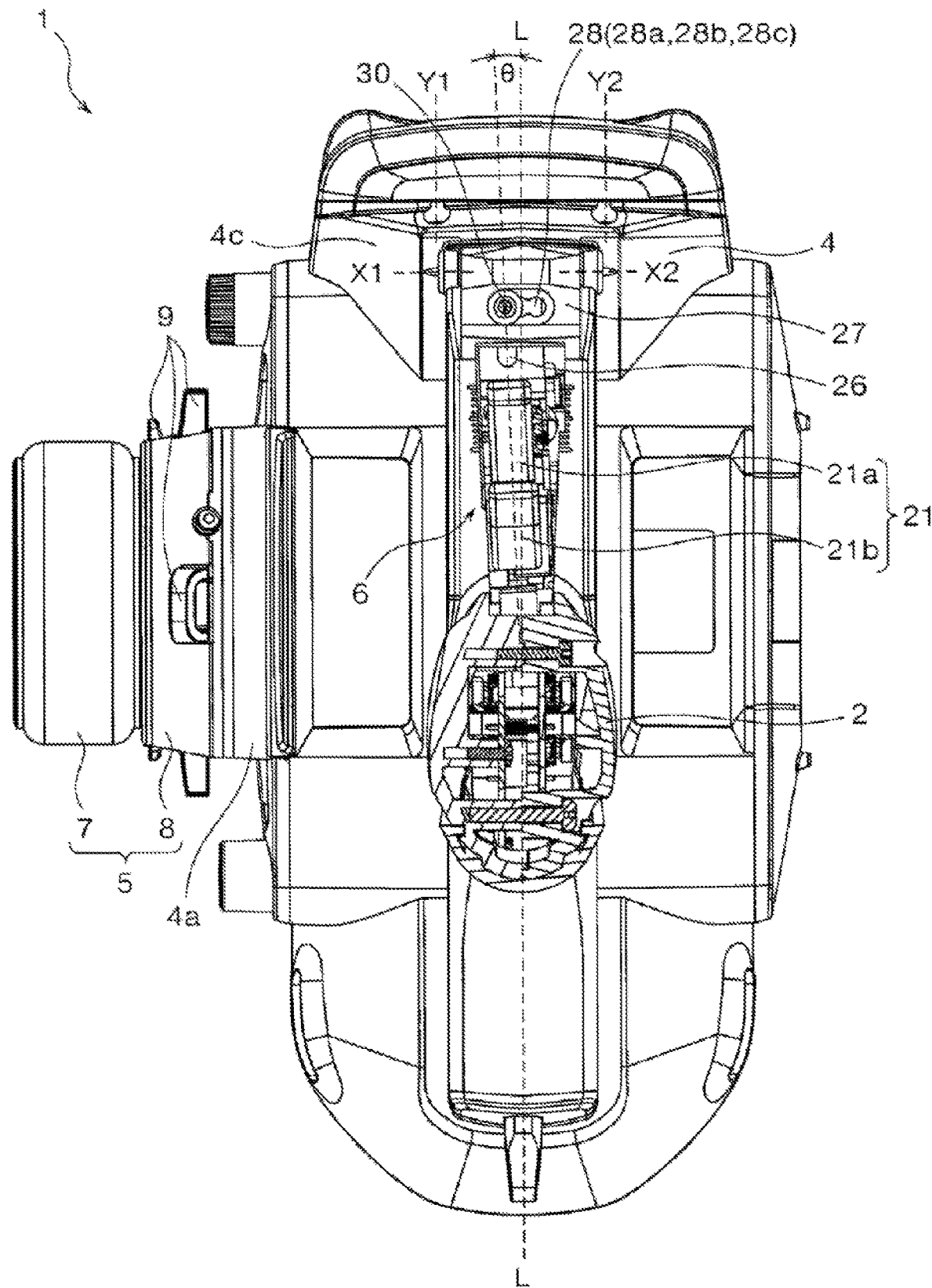
FIG. 10 is a cross-section view of the radio control transmitter taken along the line C2-C2 of FIG. 2 viewed from the bottom surface side after the angle adjustment of the trigger unit.

In the case of changing the horizontal angle θ of the trigger 21 centered on the holding positions of the pair of support members 22 and 23 from the state shown in FIG. 8, the elongated hole 26 of the support member 22 is aligned with the round hole 28a on the left side of the fitting hole 28 in a state where the screw 30 is loosened from the outside of the bottom portion 4c of the head portion 4 and, then, the screw 30 is tightened again, as shown in FIG. 10, for example. Accordingly, as shown in FIG. 9, the horizontal angle of the trigger 21 centered on the holding positions of the pair of support members 22 and 23 is changed by θ (e.g., 3°) with respect to the central axis L.

In the case of performing the length adjustment of the trigger 21 as well as the angle adjustment thereof, the pair of support members 22 and 23 of the trigger unit 6 are moved in the forward direction of the central axis L along the guide surfaces 4b and 4b of the head portion 4 in a state where the screw 30 is loosened from the outside of the bottom portion 4c of the head portion 4, and the elongated hole 26 of the support member 22 is aligned with the fitting hole 28 (any of the round holes 28a, 28b, and 28c selected by the above-described angle adjustment). Then, the screw 30 is tightened again.

In the above-described embodiment, the case in which the fitting hole 28 aligned with the elongated hole 26 of the fitting piece 22e of the support member 22 of the trigger unit 6 is formed in the fitting member 27 fixed to the bottom portion 4c of the head portion 4 has been illustrated and described. However, the fitting hole 28 may be directly formed at the bottom portion 4c on the tip end side of the head portion 4.

Figure 11:
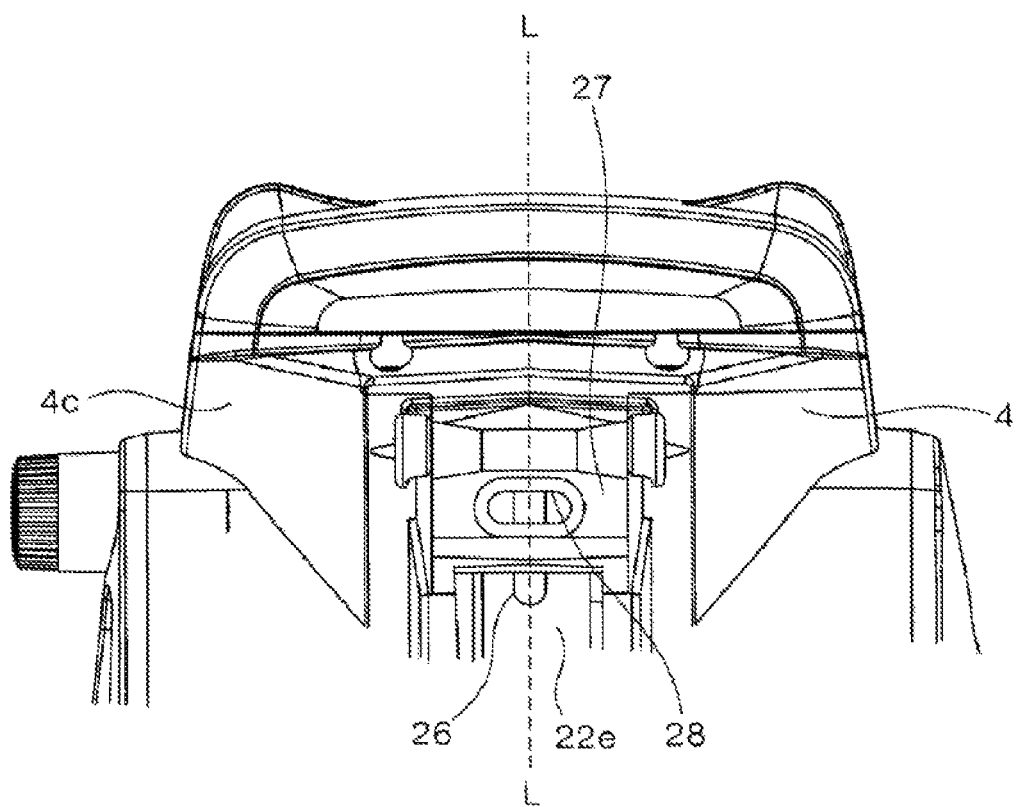
FIG. 11 is a partially enlarged view showing another example of a fitting hole through which the trigger unit of the radio control transmitter according to the present disclosure is fitted.

As shown in FIG. 6, the fitting hole 28 does not necessarily have a structure in which a plurality of round holes are continuously arranged in the width direction of the head portion 4. For example, as shown in FIG. 11, a round hole may be elongated by a predetermined length in the width direction of the head portion 4. In the case of the fitting hole 28 formed as an elongated hole, the horizontal angle θ of the trigger 21 centered on the holding positions of the pair of support members 22 and 23 can be continuously changed by screw-fixing the elongated hole 26 of the support member 22 of the trigger unit 6 in a state where the elongated hole 26 is aligned within the range of the elongated hole of the fitting hole 28.

As described above, the transmitter 1 of the present embodiment employs the configuration in which the fitting hole in which the plurality of round holes are continuously arranged in the width direction of the head portion 4 is formed at the fitting member 27 fixed to the bottom portion 4c of the housing of the head portion 4 or at the bottom portion 4c of the housing of the head portion 4, and the base end of the trigger unit 6 near the grip portion 2 is supported to be rotatable with respect to the guide surfaces 4b and 4b formed on both inner wall surfaces of the housing of the head portion 4, and the tip end of the trigger unit 6 is aligned with and screw-fixed to any one of the round holes of the fitting hole 28 so that and the horizontal angle of the trigger 21 centered on the holding position of the base end of the trigger unit 6 can be changed in a stepwise manner. Accordingly, the trigger unit 6 can be fixed to the head portion 4 without displacement, and the angle of the trigger can be adjusted in a stepwise manner depending on an operator's habit of putting a finger on the trigger.

In another embodiment, there is employed a configuration in which the fitting hole 28 in which a round hole is elongated by a predetermined length in the width direction of the head portion 4 is formed at the fitting member 27 fixed to the bottom portion 4c of the housing of the head portion 4 or at the bottom portion 4c of the housing of the head portion 4, and the base end of the trigger unit 6 near the grip portion is supported to be rotatable with respect to the guide surfaces 4b and 4b formed on both inner wall surfaces of the housing of the head portion 4, and the tip end of the trigger unit 6 is aligned with and screw-fixed to the elongated hole serving as the fitting hole 28 so that and the horizontal angle of the trigger 21 centered on the holding position of the base end of the trigger unit 6 can be changed continuously. Accordingly, the angle of the trigger can be finely adjusted, and it is possible to more flexibly cope with an operator's habit of putting a finger on the trigger.

By forming the elongated hole 26 having a shape in which a round hole is elongated by a predetermined length in a direction perpendicular to the rotation shaft 21c of the trigger 21 formed at the tip end of the trigger unit 6, moving the trigger unit 6 in the forward-backward direction of the head portion 4 along the guide surfaces 4b and 4b of the head portion 4, and aligning and screw-fixing the elongated hole to the fitting hole 28, the length adjustment of the trigger can be performed in addition to the above-described angle adjustment of the trigger. Further, it is possible to more flexibly cope with an operator's habit of putting a finger on the trigger.

The above-described adjustment of the angle or the length of the trigger can be performed with a simple configuration using screws that are operated from the outside of the bottom portion of the head portion without disassembling the transmitter.

While the best mode of the transmitter of the present disclosure has been described, the present disclosure is not limited by the description and the drawings thereof. In other words, other embodiments, examples, operational technologies, and the like that are conceived by those skilled in the art are all included in the scope of the present disclosure.

The invention claimed is:

1. A radio control transmitter comprising
a grip portion gripped by an operator at the time of performing remote control of a control target,
a base portion disposed at one end of the grip portion, and
a head portion disposed at the other end of the grip portion and having an operating unit including a trigger, configured to control the control target, and
configured to transmit a control signal to the control target in response to an operation of the operating unit,
wherein a fitting hole in which a plurality of round holes are continuously arranged in a width direction of the head portion is formed at a bottom portion of a housing of the head portion, and
a base end of the operating unit near the grip portion is supported to be rotatable with respect to an inner wall surface of the housing of the head portion, and
a tip end of the operating unit is aligned with and screw-fixed to the fitting hole so that a horizontal angle of the trigger centered on a holding position of the base end is changed in a stepwise manner.

2. A radio control transmitter comprising
a grip portion gripped by an operator at the time of performing remote control of a control target,
a base portion disposed at one end of the grip portion, and
a head portion disposed at the other end of the grip portion and having an operating unit including a trigger, configured to control the control target, and
configured to transmit a control signal to the control target in response to an operation of the operating unit,
wherein a fitting hole, in which a round hole is elongated by a predetermined length in a width direction of the head portion is formed at a bottom portion of a housing of the head portion, and
a base end of the operating unit near the grip portion is supported to be rotatable with respect to an inner wall surface of the housing of the head portion, and
a tip end of the operating unit is aligned with and screw-fixed to the fitting hole so that a horizontal angle of the trigger centered on a holding position of the base end is changed continuously.

3. The radio control transmitter of claim 1, wherein an elongated hole is formed by elongating a round hole by a predetermined length in a direction perpendicular to a rotation axis of the trigger and is formed at the tip end of the operating unit, and the operating unit is movable in a forward-backward direction of the head portion along an inner wall surface of the housing of the head portion, and the elongated hole is aligned with and screw-fixed to the fitting hole.

4. The radio control transmitter of claim 2, wherein the elongated hole is formed by elongating a round hole by a predetermined length in a direction perpendicular to a rotation axis of the trigger and is formed at the tip end of the operating unit, and the operating unit is movable in a forward-backward direction of the head portion along an inner wall surface of the housing of the head portion, and the elongated hole is aligned with and screw-fixed to the fitting hole.

* * * * *